US009515782B2

(12) United States Patent
Lin et al.

(10) Patent No.: US 9,515,782 B2
(45) Date of Patent: Dec. 6, 2016

(54) HARQ FEEDBACK IMPLEMENTATION METHOD AND DEVICE

(71) Applicant: China Academy of Telecommunications Technology, Beijing (CN)

(72) Inventors: Yanan Lin, Beijing (CN); Zukang Shen, Beijing (CN); Qianqian Si, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 32 days.

(21) Appl. No.: 14/384,017

(22) PCT Filed: Feb. 26, 2013

(86) PCT No.: PCT/CN2013/071880
§ 371 (c)(1),
(2) Date: Sep. 9, 2014

(87) PCT Pub. No.: WO2013/131435
PCT Pub. Date: Sep. 12, 2013

(65) Prior Publication Data
US 2015/0055519 A1  Feb. 26, 2015

(30) Foreign Application Priority Data

Mar. 9, 2012 (CN) .......................... 2012 1 0062357

(51) Int. Cl.
*H04W 4/00* (2009.01)
*H04L 1/18* (2006.01)
(Continued)

(52) U.S. Cl.
CPC ........... *H04L 1/1887* (2013.01); *H04L 1/1607* (2013.01); *H04L 1/1861* (2013.01); *H04L 5/0055* (2013.01); *H04L 5/14* (2013.01)

(58) Field of Classification Search
None
See application file for complete search history.

(56) References Cited

U.S. PATENT DOCUMENTS

2011/0243066 A1* 10/2011 Nayeb Nazar .......... H04L 1/007
370/328
2012/0057487 A1* 3/2012 Ahn ...................... H04L 1/1614
370/252
(Continued)

FOREIGN PATENT DOCUMENTS

CN  101841398 A  9/2010
CN  102164029 A  8/2011
(Continued)

OTHER PUBLICATIONS

CATT: "Design of TDD Inter-band Carrier Aggregation", 3GPP Draft; R1-112944, 3rd Generation Partnership Project (3GPP), Mobile Competence Centre ; 650, Route Des Lucioles ; F-06921 Sophia-Antipolis Cedex ; France, vol. RAN WG1, No. Zhuhai; 20111010, Oct. 4, 2011, XP050538150, [retrieved on Oct. 4, 2011].
(Continued)

*Primary Examiner* — Anh-Vu Ly
(74) *Attorney, Agent, or Firm* — Kilpatrick Townsend & Stockton LLP

(57) ABSTRACT

Disclosed are an HARQ feedback implementation method and device. The method comprises: according to a TDD uplink/downlink reference configuration, dividing all downlink subframes contained in an FDD downlink carrier into two types, wherein the downlink subframes of the first type correspond to downlink subframes or/and special subframes in the TDD uplink/downlink reference configuration, and the downlink subframes of the second type correspond to the uplink subframes in the TDD uplink/downlink reference configuration; feeding back ACK/NACK information corresponding to the downlink subframes of the first type according to the timing sequence relationship in the TDD uplink/downlink reference configuration; and feeding back the ACK/NACK information corresponding to a downlink subframe m of the downlink subframes of the second type on an uplink subframe first meeting a preset condition after a subframe m+3 in the TDD uplink/downlink reference configuration. Thus, ACK/NACK information corresponding to downlink data can be accurately fed back in time, thereby performing accurate data retransmission, and then effectively guaranteeing the system performance.

20 Claims, 10 Drawing Sheets

(51) Int. Cl.
*H04L 1/16* (2006.01)
*H04L 5/00* (2006.01)
*H04L 5/14* (2006.01)

(56) References Cited

U.S. PATENT DOCUMENTS

| | | | |
|---|---|---|---|
| 2012/0087254 A1* | 4/2012 | Yin | H04L 1/0031 370/252 |
| 2012/0120926 A1* | 5/2012 | Chen | H04L 5/0007 370/336 |
| 2012/0155337 A1* | 6/2012 | Park | H04L 1/1692 370/280 |
| 2012/0257513 A1* | 10/2012 | Yamada | H04L 1/0618 370/248 |
| 2012/0300641 A1* | 11/2012 | Chen | H04L 1/0026 370/241 |
| 2013/0028205 A1* | 1/2013 | Damnjanovic | H04L 5/001 370/329 |
| 2013/0114472 A1* | 5/2013 | Tamaki | H04L 1/1854 370/280 |
| 2013/0294423 A1* | 11/2013 | Wang | H04N 21/2365 370/336 |

FOREIGN PATENT DOCUMENTS

| | | |
|---|---|---|
| CN | 102255718 A | 11/2011 |
| CN | 102271032 A | 12/2011 |
| WO | 2011137444 A1 | 11/2011 |

OTHER PUBLICATIONS

CATT: "Design of TDD Inter-band Carrier Aggregation", 3GPP Draft; R1-113724, 3rd Generation Partnership Project (3GPP), Mobile Competence Centre ; 650, Route Des Lucioles ; F-06921 Sophia-Antipolis Cedex ; France, vol. RAN WG1, No. San Francisco; 20111114-20111118, Nov. 8, 2011, XP050561843, [retrieved on Nov. 8, 2011].
Extended European Search Report issued in the European counterpart application EP 13757528.8, mailed Feb. 20, 2015, 8 pages.
International Search Report for PCT/CN2013/071880.

* cited by examiner

HARQ FEEDBACK IMPLEMENTATION METHOD AND DEVICE

This application is a US National Stage of International Application No. PCT/CN2013/071880, filed on Feb. 26, 2013, designating the United States and claiming priority to Chinese Patent Application No. 201210062357.3, filed with the State Intellectual Property Office of People's Republic of China on Mar. 9, 2012 and entitled "HARQ feedback implementation method and device", the content of which is incorporated herein by reference in its entirety.

FIELD OF THE INVENTION

The present invention relates to the field of communication and particularly to a Hybrid Automatic Repeat ReQuest (HARQ) feedback method and device.

BACKGROUND OF THE INVENTION

Three duplex modes, Frequency Division Duplex (FDD), Half-FDD (H-FDD) and Time Division Duplex (TDD), are currently supported by Long Term Evolution (LTE).

FDD refers to uplink transmission and downlink transmission in different carrier frequencies to allow concurrent reception and transmission of signals by a base station and a user equipment; and TDD refers to uplink transmission and downlink transmission in the same carrier frequency to allow transmission and reception of signals respectively by a base station and a user equipment in different periods of time, or allow reception and transmission of signals respectively by a base station and a user equipment in different periods of time.

In wireless communication system of LTE and earlier wireless communication systems, a cell is configured with only one carrier, and the maximum bandwidth in LTE system is 20 MHz, particularly as illustrated in FIG. 1.

Compared with the peak rate of LTE system, the peak rate of Long Term Evolution-Advanced (LTE-A) system improves significantly, wherein the peak rate of LTE-A system is required to be 1 Gbps in the downlink and 500 Mbps in the uplink. The requirement of the peak rate can not be met with only one carrier with a maximum bandwidth of 20 MHz. Thus, the bandwidth available to the user equipment in LTE-A system needs to be extended, and in view of this, Carrier Aggregation (CA) has been introduced, that is, a plurality of consecutive or inconsecutive carriers in the same base station (eNB) are aggregated together to serve the user equipment concurrently with a desirable rate. These carriers aggregated together are also referred to as Component Carriers (CCs). Each cell can be a component carrier, and cells (component carriers) in different eNBs can not be aggregated. In order to ensure that the user equipment of LTE system can operate over each of the aggregated carriers, the frequency of each aggregated carrier is no more than 20 MHz, particularly as illustrated in FIG. 2. There are four carriers that can be aggregated in the base station of LTE-A system as illustrated in FIG. 2 so that the base station can transmit data with the user equipment over the four carriers concurrently to thereby improve the throughput of the system.

At present carrier aggregation across systems is not supported by LTE system, that is, an FDD carrier can only be aggregated with an FDD carrier, and a TDD carrier can only be aggregated with a TDD carrier.

Both in the FDD mode and the TDD mode of LTE system, the time-length of a radio frame is 10 ms, and the time-length of a sub-frame is 1 ms. Seven TDD uplink-downlink configurations are defined for each radio frame of the TDD mode, particularly as illustrated in Table 1, wherein D represents a downlink (DL) sub-frame, U represents an uplink (UL) sub-frame, and S represents a special sub-frame.

TABLE 1

(TDD uplink-downlink configurations)

| uplink-downlink configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In FDD mode of LTE system, a user equipment receives downlink data in sub-frame n−4 and feeds back signaling of whether the data in the downlink sub-frame needs to be retransmitted, that is, feeds back Acknowledgement/Negative Acknowledgement (ACK/NACK) information in uplink sub-frame n, also referred to as a Physical Downlink Shared Channel Hybrid Automatic Repeat ReQuest (PDSCH HARQ) in uplink sub-frame n. When carriers are aggregated, ACK/NACK information corresponding to a plurality of downlink carriers in sub-frame n−4 will be fed back in uplink sub-frame n concurrently.

In TDD mode of LTE system, a user equipment may feed back, ACK/NACK information corresponding to a plurality of downlink sub-frames, in the same uplink sub-frame, that is, user equipment detects Physical Downlink Shared Channel (PDSCH) transmission or Physical Downlink Control Channel (PDCCH) indicating downlink semi-persistent scheduling release, in downlink sub-frame n-k and feeds back the corresponding ACK/NACK information in uplink sub-frame n, wherein k∈K, and values in the set K depend upon the TDD uplink-downlink configuration of the system and a particular sub-frame index, particularly as illustrated in Table 2; and particularly special sub-frames of special sub-frame configuration 0 and 5 with a normal Cyclic Prefix (CP) and special sub-frames of special sub-frame configuration 0 and 4 with an extended CP have no ACK/NACK feedback, that is, the user equipment will not feed back ACK/NACK information for such special sub-frames.

TABLE 2

(related TDD downlink K values: $\{k_0, k_1, \Lambda\ k_{M-1}\}$)

| uplink-downlink configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE 2-continued (related TDD downlink K values: {k$_0$, k$_1$, Λ k$_{M-1}$})

| uplink-downlink | Sub-frame index | | | | | | | | |
|---|---|---|---|---|---|---|---|---|---|
| configuration | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As illustrated in Table 2, a plurality of radio frames are arranged in order, that is, if the last sub-frame in radio frame a is k, then the first sub-frame in radio frame a+1 is k+1, and Table 2 takes a radio frame as an example and illustrates values of K corresponding to respective uplink sub-frames in the radio frame, wherein n−k<0 refers to a downlink sub-frame in the previous radio frame.

However, since carrier aggregation across systems is not supported by LTE system currently, there is no HARQ feedback solution for downlink data when carrier aggregation is performed among TDD system and FDD system so far.

SUMMARY OF THE INVENTION

Embodiments of the present invention provide an HARQ feedback method and device so as to provide an HARQ feedback smoothly when carrier aggregation is performed across systems.

Technical solutions provided by embodiments of the present invention are as follows:

An HARQ feedback method, which includes:

determining a TDD uplink-downlink reference configuration used to provide HARQ feedback for PDSCH of an FDD downlink carrier;

dividing all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and feeding back ACK/NACK information corresponding to the first type of downlink sub-frames according to a PDSCH HARQ feedback timing corresponding to the TDD uplink-downlink reference configuration; and feeding back ACK/NACK information, corresponding to downlink sub-frame m in the second type of downlink sub-frames, in the first uplink sub-frame in the TDD uplink-downlink reference configuration after sub-frame m+3 and satisfying a preset condition.

An HARQ feedback method, which includes:

determining a TDD uplink-downlink reference configuration used to provide, at the user equipment side, HARQ feedback for PDSCH of an FDD downlink carrier;

dividing all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and receiving ACK/NACK information corresponding to the first type of downlink sub-frames according to a PDSCH HARQ feedback timing corresponding to the TDD uplink-downlink reference configuration; and receiving ACK/NACK information, corresponding to downlink sub-frame m in the second type of downlink sub-frames, in the first uplink sub-frame in the TDD uplink-downlink reference configuration after sub-frame m+3 and satisfying a preset condition.

An HARQ feedback device includes:

a determining component configured to determine a TDD uplink-downlink reference configuration used to provide HARQ feedback for PDSCH of an FDD downlink carrier;

a processing component configured to divide all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and a communicating component configured to feed back ACK/NACK information corresponding to the first type of downlink sub-frames according to a PDSCH HARQ feedback timing corresponding to the TDD uplink-downlink reference configuration and to feed back ACK/NACK information, corresponding to downlink sub-frame m in the second type of downlink sub-frames, in the first uplink sub-frame in the TDD uplink-downlink reference configuration after sub-frame m+3 and satisfying a preset condition.

An HARQ feedback device includes:

a determining component configured to determine a TDD uplink-downlink reference configuration used to provide, at a user equipment side, HARQ feedback for PDSCH of an FDD downlink carrier;

a controlling component configured to divide all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and a communicating component configured to receive ACK/NACK information corresponding to the first type of downlink sub-frames according to a PDSCH HARQ feedback timing corresponding to the TDD uplink-downlink reference configuration and to receive ACK/NACK information, corresponding to downlink sub-frame m in the second type of downlink sub-frames, in the first uplink sub-frame in the TDD uplink-downlink reference configuration after sub-frame m+3 and satisfying a preset condition.

In summary, in the embodiments of the present invention, a PDSCH HARQ feedback solution has been devised in an application scenario where a TDD carrier is aggregated with an FDD DL carrier, wherein the user equipment divides all downlink sub-frames of the FDD downlink carrier into two types according to the determined TDD uplink-downlink reference configuration used to provide HARQ feedback for PDSCH of the FDD downlink carrier, wherein the first type of downlink sub-frames correspond to downlink sub-frames or special sub-frames in the TDD uplink-downlink reference configuration, and the second type of downlink sub-frames correspond to uplink sub-frames in the TDD uplink-downlink reference configuration; and feeds back ACK/NACK information corresponding to the first type of downlink sub-frames according to the PDSCH HARQ feedback timing corresponding to the TDD uplink-downlink reference configuration and feeds back ACK/NACK information corresponding to downlink sub-frame m in the second type of downlink sub-frames in the first uplink sub-frame in the TDD uplink-downlink reference configuration after sub-frame m+3 and satisfying the preset condition; and correspondingly the base station also receives the ACK/NACK information fed back from the user equipment side in the same way. Thus the user equipment can feed back, in a timely and accurate manner, the ACK/NACK information corresponding to downlink data to the base station, so that the base station can retransmit the data accurately according to the obtained ACK/NACK information to thereby guarantee effectively the performance of the system.

DETAILED DESCRIPTION OF THE EMBODIMENTS

For an application scenario with carrier aggregation across systems, a novel HARQ feedback solution is devised in embodiments of the present invention.

Preferred embodiments of the present invention will be described below in details with reference to the drawings.

Figure 1:
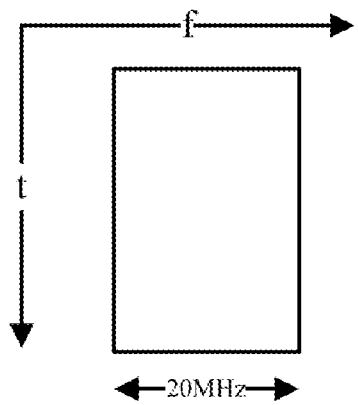
FIG. 1 is a schematic diagram of distribution of a carrier in the LTE system in the prior art.
Figure 2:
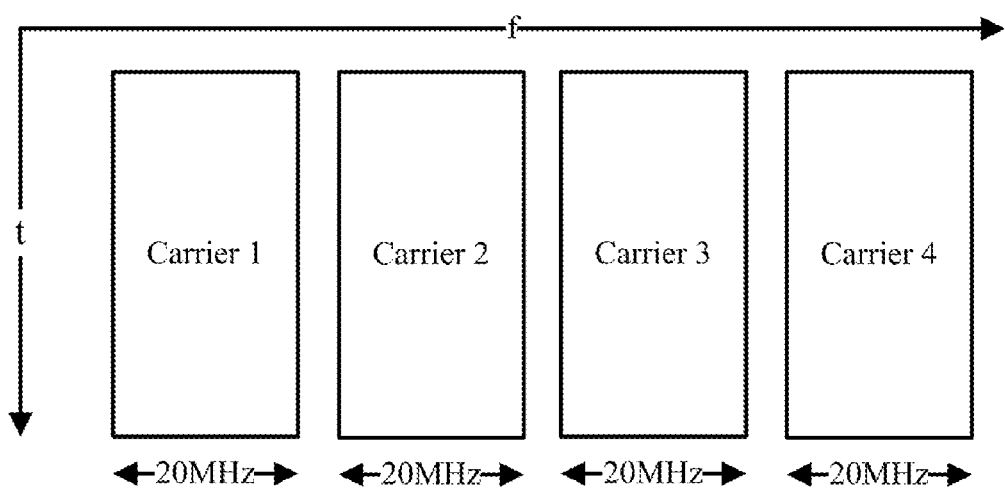
FIG. 2 is a schematic diagram of distribution of carriers in the LTE-A system with CA technology in the prior art.
Figure 3:
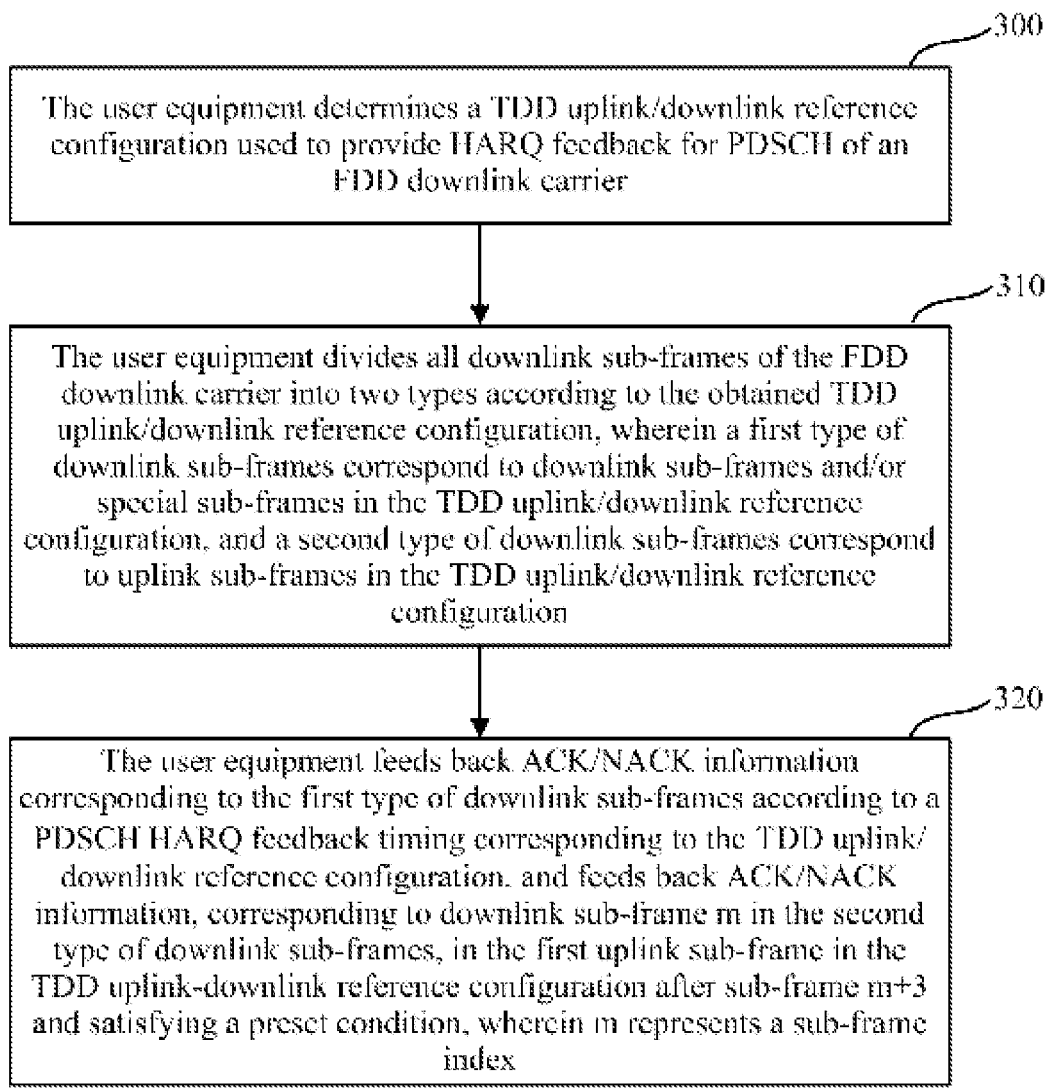
FIG. 3 is a flow chart of a method for providing a PDSCH HARQ feedback by a user equipment according to an embodiment of the present invention.

In the embodiments of the present invention, preferably a TDD carrier is aggregated as a primary carrier with an FDD downlink carrier, that is, the corresponding ACK/NACK information can only be transmitted over the primary carrier (i.e., the TDD carrier) when a PDSCH HARQ feedback is provided for the FDD downlink carrier, and then reference is made to FIG. 3, a detailed flow of a method for making a PDSCH HARQ feedback by a user equipment is as follows:

In step 300, the user equipment determines a TDD uplink-downlink reference configuration used to provide HARQ feedback for PDSCH of an FDD downlink carrier, that is, determines uplink sub-frames in a TDD carrier, wherein the uplink sub-frames can carry ACK/NACK information corresponding to the FDD downlink carrier. For the sake of a convenient description, in the following embodiments, "a TDD uplink-downlink reference configuration used to provide HARQ feedback for PDSCH of an FDD downlink carrier" will be referred to as "a TDD uplink-downlink reference configuration corresponding to an FDD carrier" for short, or can be further referred to as "a TDD uplink-downlink reference configuration" for short.

In this embodiment, preferably the TDD uplink-downlink reference configuration of the user equipment can be one of the seven configurations supported by LTE TDD system, particularly as illustrated in Table 1, but will not be limited thereto. Details will be given below.

The TDD uplink-downlink configuration in use of a TDD carrier aggregated with the FDD carrier can be determined by the user equipment as the TDD uplink-downlink reference configuration; the TDD uplink-downlink configuration configured for PDSCH HARQ feedback of a TDD carrier can be determined as the TDD uplink-downlink reference configuration (which may be different from the TDD uplink-downlink configuration in use of the TDD carrier); or a TDD uplink-downlink configuration configured by higher-layer signaling from the network side can be determined as the TDD uplink-downlink reference configuration, wherein all uplink sub-frames included in the TDD uplink-downlink configuration configured by higher-layer signaling are a subset of all uplink sub-frames included by the primary carrier; or a TDD uplink-downlink configuration according to a predetermined method can be determined as the TDD uplink-downlink reference configuration, for example, TDD uplink-downlink reference configuration 5 is prescribed as the TDD uplink-downlink configuration all the time, or TDD uplink-downlink reference configuration 2 is prescribed as the TDD uplink-downlink configuration when the TDD carrier carrying ACK/NACK information corresponding to the FDD downlink carrier has a switching point of 5 ms; or TDD uplink-downlink reference configuration 5 is prescribed as the TDD uplink-downlink configuration when the TDD carrier carrying ACK/NACK information corresponding to the FDD downlink carrier has a switching point of 10 ms.

In step 310, the user equipment divides all downlink sub-frames of the FDD downlink carrier into two types according to the obtained TDD uplink-downlink reference configuration, wherein a first type of downlink sub-frames correspond to downlink sub-frames or special sub-frames in the TDD uplink-downlink reference configuration, and a second type of downlink sub-frames correspond to uplink sub-frames in the TDD uplink-downlink reference configuration.

Figure 4:
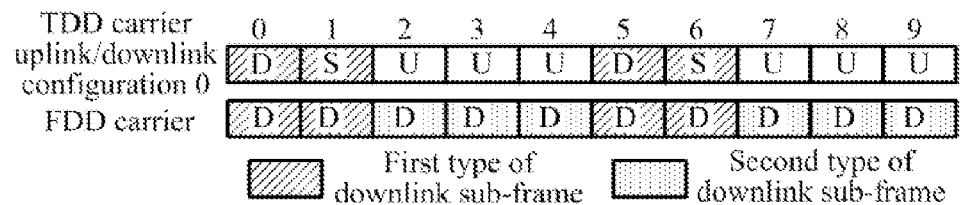
FIG. 4 is a schematic diagram of categorized sub-frames in an FDD downlink carrier according to an embodiment of the present invention.

Referring to FIG. 4, for example, if the TDD uplink-downlink reference configuration is TDD uplink-downlink configuration 0, then downlink sub-frames 0, 1, 5 and 6 of the FDD downlink carrier are the first type of downlink sub-frames, and downlink sub-frames 2, 3, 4, 7, 8 and 9 are the second type of downlink sub-frames.

In the step 320, the user equipment feeds back ACK/NACK information corresponding to the first type of downlink sub-frames according to a PDSCH HARQ feedback timing corresponding to the TDD uplink-downlink reference configuration, and feeds back ACK/NACK information, corresponding to downlink sub-frame m in the second type of downlink sub-frames, in the first uplink sub-frame in the TDD uplink-downlink reference configuration after sub-frame m+3 and satisfying a preset condition, wherein m represents a sub-frame index.

"The user equipment feeds back ACK/NACK information corresponding to the first type of downlink sub-frames according to the PDSCH HARQ feedback timing corresponding to the TDD uplink-downlink reference configuration" refers to that the user equipment feeds back ACK/NACK information of the first type of downlink sub-frames in corresponding uplink sub-frames according to the PDSCH HARQ feedback timing in Table 2 corresponding to the TDD uplink-downlink reference configuration.

For the second type of downlink sub-frames, the user equipment can feed back ACK/NACK information corresponding to downlink sub-frame m in the second type of downlink sub-frames in the first uplink sub-frame in the TDD uplink-downlink reference configuration after sub-frame m+3 and satisfying the preset condition, in one or any combination of the following three schemes without any limitation thereto.

In a first scheme (referred to as a scheme 1 below), the user equipment feeds back ACK/NACK information corresponding to downlink sub-frame m in the first uplink sub-frame in the TDD uplink-downlink reference configuration after sub-frame m+3.

Figure 5:
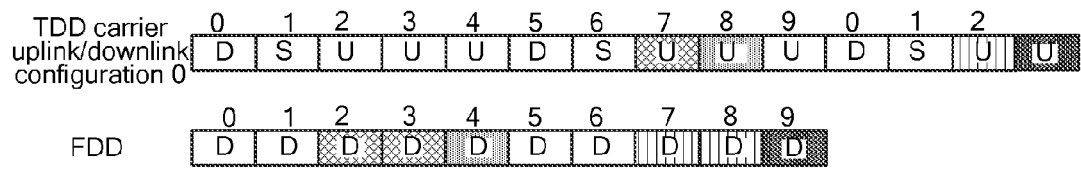
FIG. 5 is a schematic diagram of a first ACK/NACK information feedback method for a second type of downlink sub-frames according to an embodiment of the present invention.

Referring to FIG. 5, for example, when the TDD uplink-downlink reference configuration is TDD uplink-downlink configuration 0, ACK/NACK information corresponding to both downlink sub-frames 2 and 3 in the FDD carrier is transmitted in the first uplink sub-frame 7 after downlink sub-frame 5 and special sub-frame 6 indicated by TDD uplink-downlink configuration 0; ACK/NACK information corresponding to downlink sub-frame 4 in the FDD carrier is transmitted in the first uplink sub-frame 8 after uplink sub-frame 7 indicated by TDD uplink-downlink configuration 0; ACK/NACK information corresponding to downlink sub-frames 7 and 8 in the FDD carrier is transmitted in the first uplink sub-frame 2 after downlink sub-frame 0 and special sub-frame 1 in the next radio frame indicated by TDD uplink-downlink configuration 0; and ACK/NACK information corresponding to downlink sub-frame 9 in the FDD carrier is transmitted in the first uplink sub-frame 3 after uplink sub-frame 2 in the next radio frame indicated by TDD uplink-downlink configuration 0.

In a second scheme (referred to as a scheme 2 below), the user equipment feeds back ACK/NACK information corresponding to downlink sub-frame m in the second type of downlink sub-frames in the TDD uplink-downlink reference configuration after sub-frame m+3 and carrying ACK/NACK information for the first type of downlink sub-frames.

Figure 6:
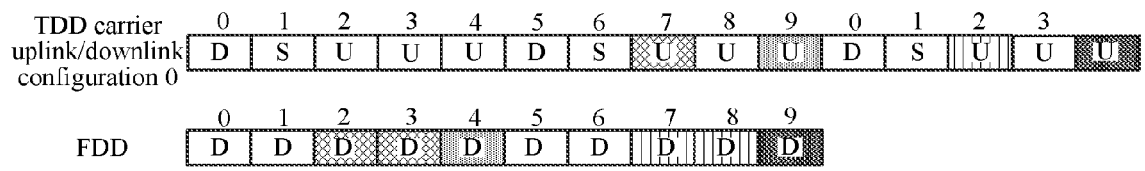
FIG. 6 is a schematic diagram of a second ACK/NACK information feedback method for a second type of downlink sub-frames according to an embodiment of the present invention.

Referring to FIG. 6, when the TDD uplink-downlink reference configuration is TDD uplink-downlink configuration 0, ACK/NACK information to be fed back is carried in uplink sub-frames 2, 4, 7 and 9, and no ACK/NACK information to be fed back is carried in uplink sub-frames 3 and 8, and then ACK/NACK information corresponding to both downlink sub-frames 2 and 3 in the FDD carrier is transmitted in the first uplink sub-frame 7 carrying ACK/NACK information after downlink sub-frame 5 and special sub-frame 6 indicated by TDD uplink-downlink reference configuration 0; ACK/NACK information corresponding to downlink sub-frame 4 in the FDD carrier is transmitted in the first uplink sub-frame 9 carrying ACK/NACK information after uplink sub-frame 7 indicated by TDD uplink-downlink reference configuration 0; ACK/NACK information corresponding to both downlink sub-frames 7 and 8 in the FDD carrier is transmitted in the first uplink sub-frame 2 carrying ACK/NACK information after downlink sub-frame 0 and special sub-frame 1 in the next radio frame indicated by TDD uplink-downlink reference configuration 0; and ACK/NACK information corresponding to downlink sub-frame 9 in the FDD carrier is transmitted in the first uplink sub-frame 4 carrying ACK/NACK information after uplink sub-frame 3 indicated by TDD uplink-downlink reference configuration 0.

In a third scheme (referred below to as a scheme 3), the user equipment feeds back ACK/NACK information corresponding to downlink sub-frame m in the second type of downlink sub-frames in the TDD uplink-downlink reference configuration after sub-frame m+3 and not carrying ACK/NACK information for the first type of downlink sub-frames.

Figure 7:
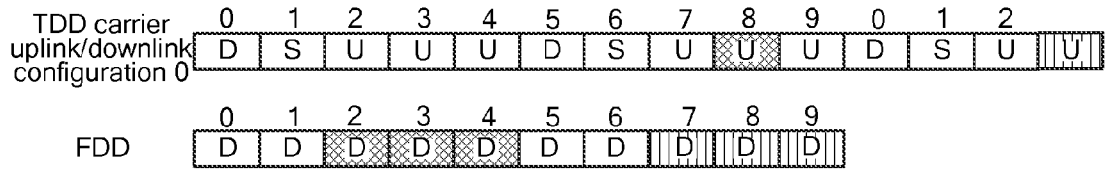
FIG. 7 is a schematic diagram of a third ACK/NACK information feedback method for a second type of downlink sub-frames according to an embodiment of the present invention.

Referring to FIG. 7, when the TDD uplink-downlink reference configuration is TDD uplink-downlink configuration 0, ACK/NACK information to be fed back is carried in the uplink sub-frames 2, 4, 7 and 9, and no ACK/NACK information to be fed back is carried in uplink sub-frames 3 and 8, and then ACK/NACK information corresponding to any one of downlink sub-frames 2, 3 and 4 in the FDD carrier is transmitted in the first uplink sub-frame 8 carrying no ACK/NACK information after downlink sub-frame 5, special sub-frame 6 and uplink sub-frame 7 indicated by TDD uplink-downlink reference configuration 0; and ACK/NACK information corresponding to any one of downlink sub-frames 7, 8 and 9 in the FDD carrier is transmitted in the first uplink sub-frame 3 carrying no ACK/NACK information after downlink sub-frame 0, special sub-frame 1 and uplink sub-frame 2 in the next radio frame indicated by TDD uplink-downlink reference configuration 0.

After the uplink sub-frames to transmit ACK/NACK information corresponding respectively to the first type of downlink sub-frames and the second type of downlink sub-frames are determined in the TDD carrier in one or any combination of the three schemes above, preferably the user equipment can adjust the locations of the determined uplink sub-frames in the following two schemes without any limitation thereto before feeding back ACK/NACK information, to thereby make the resources in the system allocated more evenly.

In a first adjustment scheme (referred below to as a scheme 4), if the determined uplink sub-frames include uplink sub-frame n' and uplink sub-frame n" (n'<n") corresponding respectively to number of downlink sub-frame $N_{DL}$ and number of downlink sub-frame $N_{DL}'$ in the FDD downlink carrier with $|N_{DL}-N_{DL}'|\geq 2$, and the downlink sub-frames associated with uplink sub-frame n or uplink sub-frame n' corresponding to $\max(N_{DL}', N_{DL}")$ include the second type of downlink sub-frames, so that the uplink sub-frames corresponding to a part or all of the second type of downlink sub-frames are adjusted evenly, for example, the difference between $N_{DL}'$ and $N_{DL}"$ is adjusted to be approaching 0.

Preferably, the adjustment above shall further satisfy the following condition 1 or satisfy condition 1 and a condition 2.

Condition 1 is to lower the differences between the numbers of downlink sub-frames corresponding to different uplink sub-frames in the system, that is, to ensure ACK/NACK information carried in the respective uplink sub-frames to be as even as possible, while the time interval between any of the FDD downlink sub-frames and the corresponding uplink sub-frame is not smaller than a preset processing latency in the system. e.g., a processing latency of 4 ms specified in the LTE system.

Figure 8:
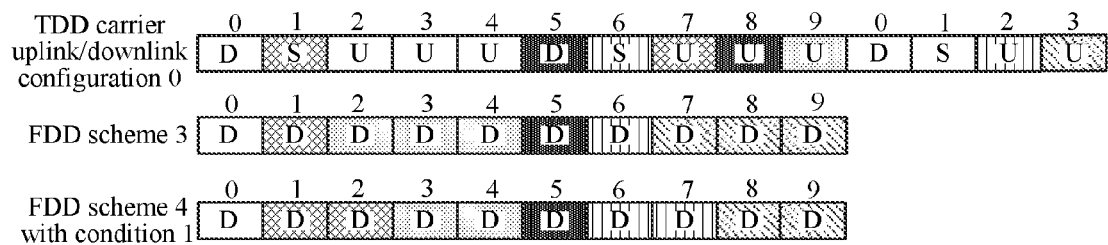
FIG. 8 and FIG. 9 are schematic diagrams of a fourth ACK/NACK information feedback method for a second type of downlink sub-frames according to an embodiment of the present invention.

Referring to FIG. 8, for example, in the scheme 3, ACK/NACK information corresponding to downlink sub-frame 1 in the first type of downlink sub-frames is fed back in uplink sub-frame 7, while ACK/NACK information corresponding to downlink sub-frames 2, 3 and 4 in the second type of downlink sub-frames is fed back in uplink sub-frame 9, and the difference between the numbers of downlink sub-frames corresponding respectively to uplink sub-frame 7 and uplink sub-frame 9 is |1−3|=2, so that a feedback of ACK/NACK information corresponding to downlink sub-frame 2 can be adjusted into uplink sub-frame 7 when the time interval between downlink sub-frame 2 and uplink sub-frame 7 is not below the preset processing latency in the system.

Condition 2: after adjusting with condition 1, in order to avoid the timing from being reversed, if the determined first type of downlink sub-frames and second type of downlink sub-frames include adjacent downlink sub-frame m' and downlink sub-frame m" (m">m') corresponding respectively to uplink sub-frame n' and uplink sub-frame n" satisfying n"<n', then the uplink sub-frame(s) corresponding to the second type of downlink sub-frame(s) among downlink sub-frame m' and downlink sub-frame m" is(are) adjusted so that the adjusted uplink sub-frame ń' and uplink sub-frame ń" corresponding to downlink sub-frame m' and downlink sub-frame m" satisfy ń"≥ń', ń"≥m"+4 and ń'≥m'+4 to thereby avoid the timing from being reversed.

Figure 9:
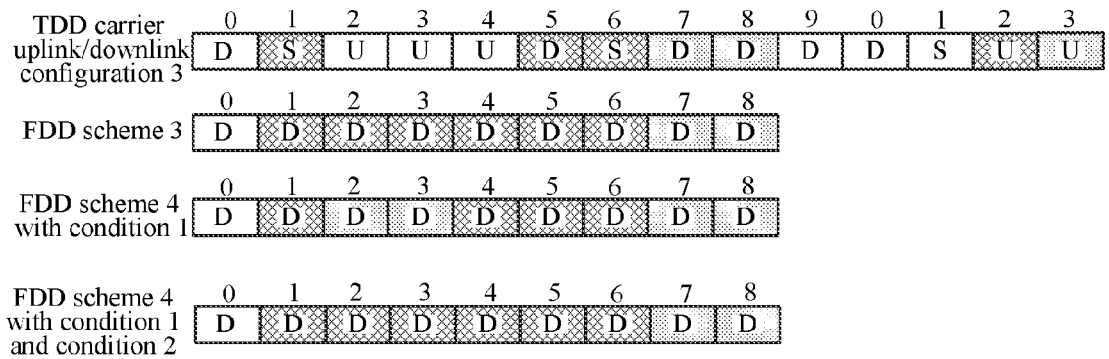

Referring to FIG. 9, for example, in the scheme 4 with condition 1, ACK/NACK information corresponding to the downlink sub-frames 1, 5 and 6 in the first type of downlink sub-frames is transmitted in uplink sub-frame 2, ACK/NACK information corresponding to downlink sub-frames 7 and 8 in the first type of downlink sub-frames is transmitted in uplink sub-frame 3, ACK/NACK information corresponding to downlink sub-frame 4 in the second type of downlink sub-frames is transmitted in uplink sub-frame 2, and ACK/NACK information corresponding to downlink sub-frames 2 and 3 in the second type of downlink sub-frames is transmitted in uplink sub-frame 3, so that in order to avoid the timing from being reversed, preferably transmission of ACK/NACK information corresponding to downlink sub-frames 2 and 3 is adjusted into uplink sub-frame 2.

In a second adjustment scheme (referred below to as a scheme 5, i.e., an enforcement with condition 2 alone), if the determined first type of downlink sub-frames and second type of downlink sub-frames include adjacent downlink sub-frame m' and downlink sub-frame m" (m">m') corresponding respectively to uplink sub-frame n' and uplink sub-frame n" satisfying n"<n', then the uplink sub-frames corresponding to the second type of downlink sub-frame(s) among downlink sub-frame m' and downlink sub-frame m" is(are) adjusted to thereby avoid the timing from being reversed.

Figure 10:
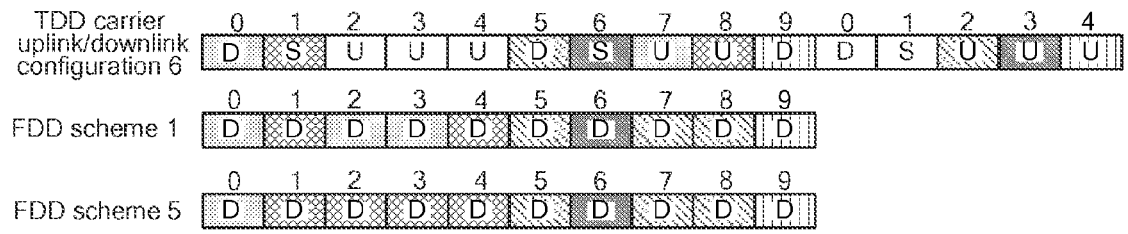
FIG. 10 is a schematic diagram of a fifth ACK/NACK information feedback method for a second type of downlink sub-frames according to an embodiment of the present invention.

Referring to FIG. 10, for example, after implementing scheme 1, ACK/NACK information corresponding to downlink sub-frame 0 in the first type of downlink sub-frames is transmitted in uplink sub-frame 7, ACK/NACK information corresponding to downlink sub-frame 1 in the first type of downlink sub-frames is transmitted in uplink sub-frame 8, ACK/NACK information corresponding to downlink sub-frame 9 in the first type of downlink sub-frames is transmitted in uplink sub-frame 4, ACK/NACK information corresponding to downlink sub-frames 2 and 3 in the second type of downlink sub-frames is transmitted in uplink sub-frame 7, ACK/NACK information corresponding to downlink sub-frame 4 in the second type of downlink sub-frames is transmitted in uplink sub-frame 8, and ACK/NACK information corresponding to downlink sub-frames 7 and 8 in the second type of downlink sub-frames is transmitted in uplink sub-frame 2, therefore, in order to avoid the timing from being reversed, preferably transmission of ACK/NACK information corresponding to downlink sub-frames 2 and 3 is adjusted into uplink sub-frame 7.

The number of ACK/NACK bits carried in the same uplink sub-frame is $$N_{ACK/NACK} = \sum_{c=0}^{C-1} N_{subframe,c},$$

wherein $N_{subframe,c}$ represents the number of downlink sub-frames for which ACK/NACK information is fed back in the uplink sub-frame in a carrier c.

The flow above will be described below in details with respect to particular application scenarios.

Figure 11:
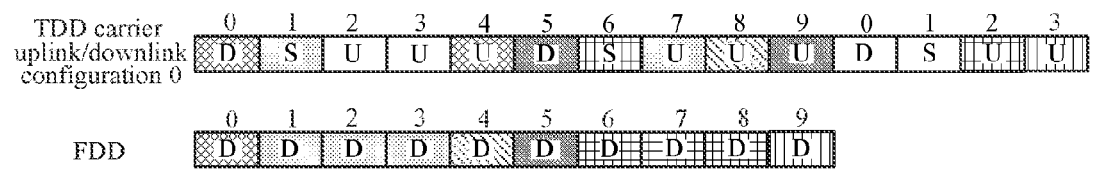
FIG. 11 to FIG. 24 are PDSCH HARQ feedback timings corresponding to various TDD uplink-downlink configurations according to embodiments of the present invention.

From the perspective of an uplink sub-frame, the user equipment feeding back ACK/NACK information corresponding to the first type of downlink sub-frames according to the PDSCH HARQ feedback timing corresponding to the TDD uplink-downlink reference configuration and feeding back ACK/NACK information, corresponding to downlink sub-frame m in the second type of downlink sub-frames, in the first uplink sub-frame in the TDD uplink-downlink reference configuration after sub-frame m+3 and satisfying the preset condition can alternatively be described as: the user equipment feeding back ACK/NACK information, corresponding to downlink sub-frame n-k, where k∈K, in the FDD carrier, in uplink sub-frame n in the TDD uplink-downlink reference configuration, wherein:

1) If the TDD uplink-downlink reference configuration corresponding to the FDD carrier is TDD uplink-downlink configuration 0, then:

In scheme 1, K={6,5,4} for n=2 and n=7, and K={4} for n=3, n=8, n=4 and n=9, particularly illustrated in FIG. 11.

Figure 12:
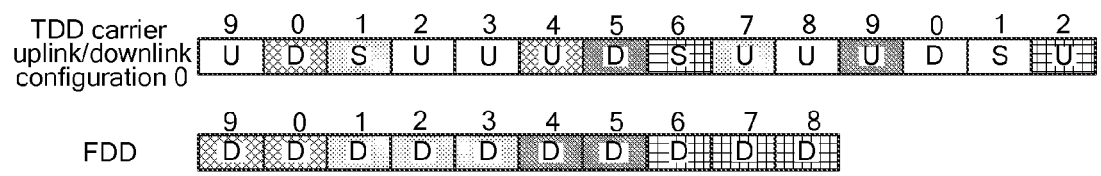

In scheme 2, K={6,5,4} for n=2 and n=7, K is a null set for n=3 and n=8, and K={5,4} for n=4 and n=9, particularly illustrated in FIG. 12.

Figure 13:
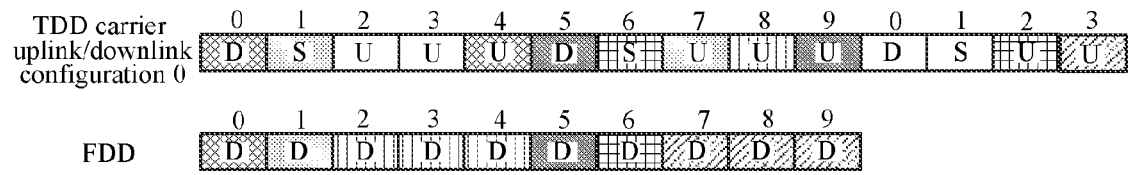

In the scheme 3, K={6} for n=2 and n=7, K={6,5,4} for n=3 and n=8, and K={4} for n=4 and n=9, particularly illustrated in FIG. 13.

Figure 14:
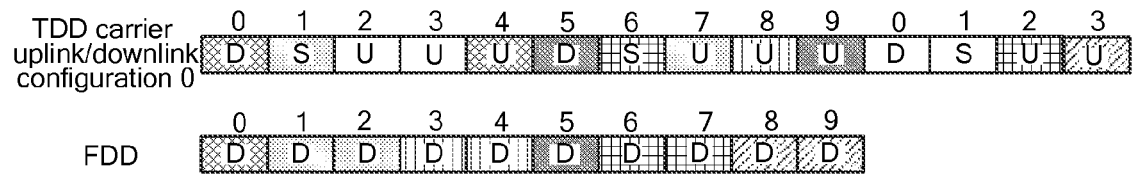

In the scheme 4 with condition 1 and/or in the scheme 4 with condition 1 and condition 2, K={6,5} for n=2 and n=7, and K={5,4} for n=3 and n=8, and K={4} for n=4 and 9, particularly illustrated in FIG. 14.

Or

Figure 15:
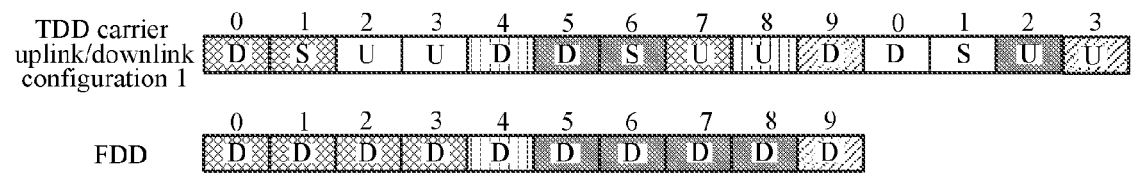

2) If the TDD uplink-downlink reference configuration corresponding to the FDD carrier is TDD uplink-downlink configuration 1, then:

In scheme 1 and/or in scheme 2, K={7,6,5,4} for n=2 and n=7, and K={4} for n=3 and n=8, particularly illustrated in FIG. 15.

Figure 16:
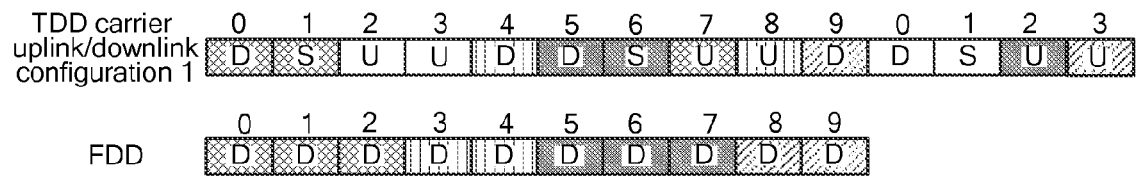

In the scheme 4 with condition 1 and/or in the scheme 4 with condition 1 and condition 2, K={7,6,5} for n=2 and n=7, and K={5,4} for n=3 and n=8, particularly illustrated in FIG. 16.

Or

Figure 17:
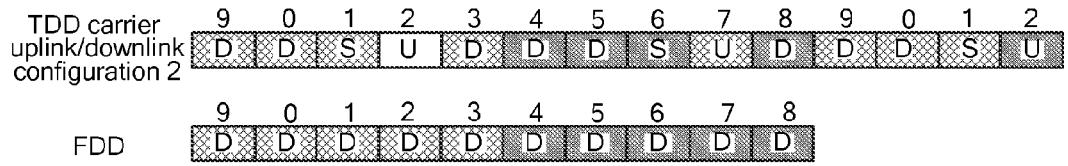

3) If the TDD uplink-downlink reference configuration corresponding to the FDD carrier is TDD uplink-downlink configuration 2, then:

In scheme 1 and/or in scheme 2, K={8,7,6,5,4} for n=2 and 7, particularly illustrated in FIG. 17.

Or

Figure 18:
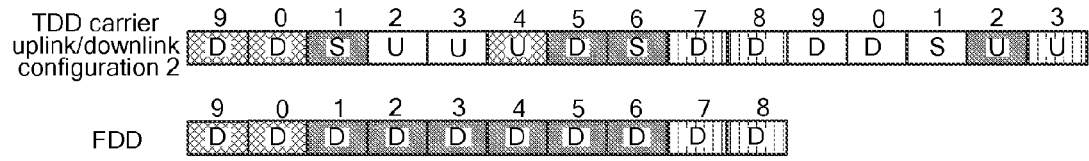

4) If the TDD uplink-downlink reference configuration corresponding to the FDD carrier is TDD uplink/downlink uplink-downlink configuration 3, then:

In one or any combination of scheme 1, scheme 2 and the scheme 4 with condition 1 and condition 2, K={11,10,9,8,7,6} for n=2, K={6,5} for n=3, and K={5,4} for n=4, particularly illustrated in FIG. 18.

Figure 19:
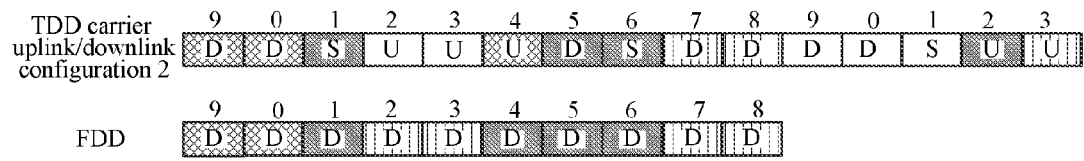

In the scheme 4 with condition 1, K={1,8,7,6} for n=2, K={11,10,6,5} for n=3, and K={5,4} for n=4, particularly illustrated in FIG. 19.

Or

Figure 20:
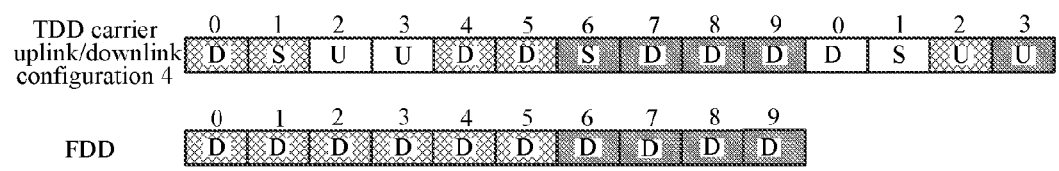

5) If the TDD uplink-downlink reference configuration corresponding to the FDD carrier is TDD uplink-downlink configuration 4, then:

In scheme 1 and/or in scheme 2, K={12,11,10,9,8,7} for n=2, and K={7,6,5,4} for n=3, particularly illustrated in FIG. 20.

Or

Figure 21:
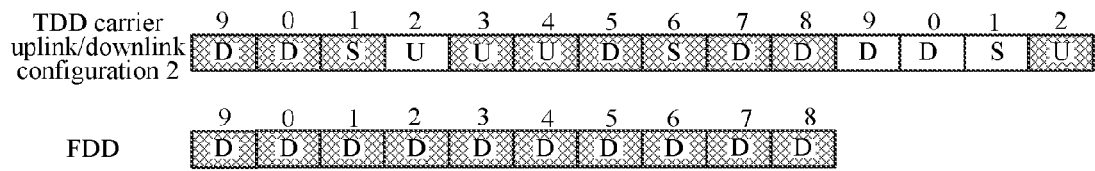

6) If the TDD uplink-downlink reference configuration corresponding to the FDD carrier is the TDD uplink-downlink configuration 5, then:

In scheme 1 and/or in scheme 2, K={13,12,11,10,9,8,7,6,5,4} for n=2, particularly illustrated in FIG. 21.

Or

Figure 22:
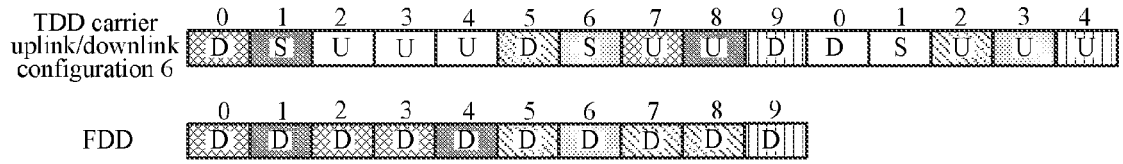

7) If the TDD uplink-downlink reference configuration corresponding to the FDD carrier is TDD uplink-downlink configuration 6, then:

In scheme 1 and/or in scheme 2, K={7,5,4} for n=2 and 7, K={7} for n=3, K={5} for n=4, and K={7,4} for n=8, particularly illustrated in FIG. 22.

Figure 23:
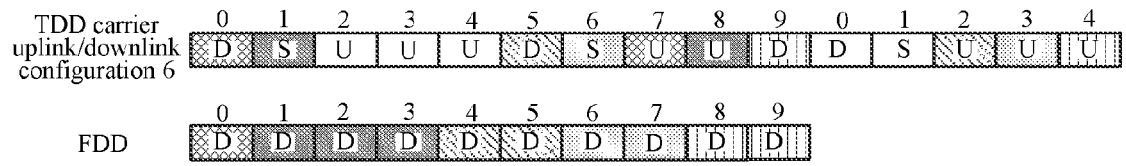

In the scheme 4 with condition 1 and/or in the scheme 4 with condition 1 and condition 2, K={8,7} for n=2, K={7,6} for n=3, K={6,5} for n=4, K={7} for n=7, and K={7,6,5} for n=8, particularly illustrated in FIG. 23.

Figure 24:
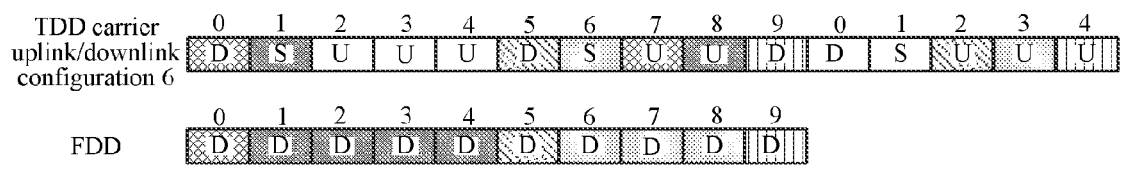
Figure 25:
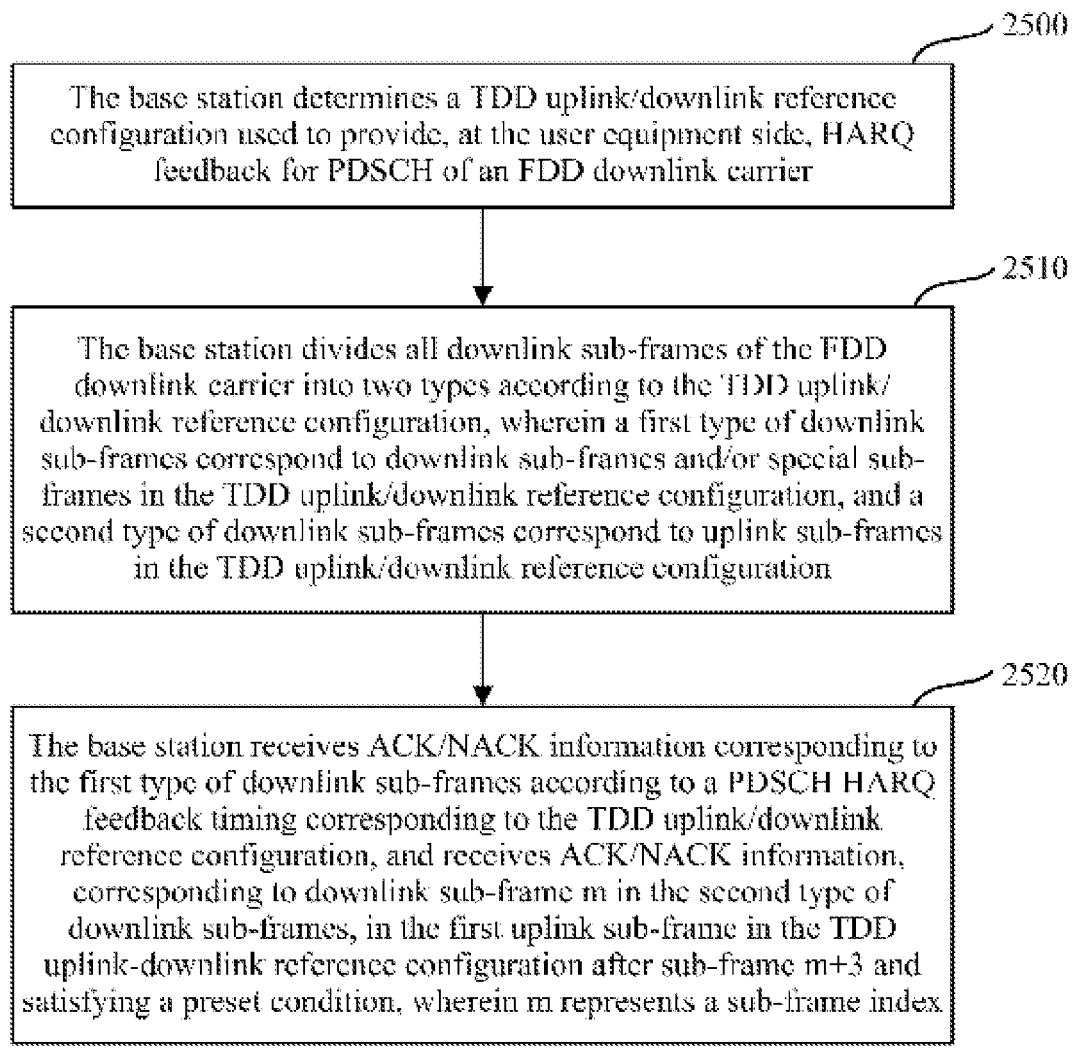
FIG. 25 is a flow chart of a method for receiving a PDSCH HARQ feedback by a base station according to an embodiment of the present invention.

In the scheme 5, K={7} for n=2 and 7, K={7,6,5} for n=3, K={5} for n=4, and K={7,6,5,4} for n=8, particularly illustrated in FIG. 24.

The order of the respective elements in the set K can be changed, and reference can be made to the relevant description of Table 2 for processing for n−k<0, so a repeated description thereof will be omitted here.

Correspondingly, in an embodiment of the present invention, the base station also needs to receive ACK/NACK information fed back by the user equipment in a corresponding scheme, particularly as illustrated 25.

In the step 2500, the base station determines a TDD uplink-downlink reference configuration used to provide, at the user equipment side, HARQ feedback for PDSCH of an FDD downlink carrier.

In an embodiment of the present invention, the TDD uplink-downlink configuration in use of a TDD carrier aggregated with the FDD carrier can be determined by the base station as the TDD uplink-downlink reference configuration; the TDD uplink-downlink configuration configured for HARQ feedback for PDSCH of a TDD carrier aggregated with the FDD carrier can be determined as the TDD uplink-downlink reference configuration; or a TDD uplink-downlink configuration configured by higher-layer signaling can be determined as the TDD uplink-downlink reference configuration, wherein all uplink sub-frames included in the TDD uplink-downlink configuration configured by higher-layer signaling are a subset of all uplink sub-frames included by a primary carrier; or a TDD uplink-downlink configuration according to a predetermined method can be determined as the TDD uplink-downlink reference configuration, for example, TDD uplink-downlink reference configuration 5 is prescribed as the TDD uplink-downlink configuration all the time, or TDD uplink-downlink reference configuration 2 is prescribed as the TDD uplink-downlink configuration when the TDD carrier carrying ACK/NACK information corresponding to the FDD downlink carrier has a switching point of 5 ms, or TDD uplink-downlink reference configuration 5 is prescribed as the TDD uplink-downlink configuration when the TDD carrier carrying ACK/NACK information corresponding to the FDD downlink carrier has a switching point of 10 ms.

In the step 2510, the base station divides all downlink sub-frames of the FDD downlink carrier into two types according to the TDD uplink-downlink reference configuration, wherein a first type of downlink sub-frames correspond to downlink sub-frames or special sub-frames in the TDD uplink-downlink reference configuration, and a second type of downlink sub-frames correspond to uplink sub-frames in the TDD uplink-downlink reference configuration.

In the step 2520, the base station receives ACK/NACK information corresponding to the first type of downlink sub-frames according to a PDSCH HARQ feedback timing corresponding to the TDD uplink-downlink reference configuration, and receives ACK/NACK information, corresponding to downlink sub-frame m in the second type of downlink sub-frames, in the first uplink sub-frame in the TDD uplink-downlink reference configuration after sub-frame m+3 and satisfying a preset condition, wherein m represents a sub-frame index.

The base station can receive ACK/NACK information, corresponding to downlink sub-frame m in the second type of downlink sub-frames, in the first uplink sub-frame in the TDD uplink-downlink reference configuration after subframe m+3 and satisfying the preset condition, in one or any combination of the following three schemes without any limitation thereto.

In a first scheme, the base station receives ACK/NACK information, corresponding to downlink sub-frame m, in the first uplink sub-frame in the TDD uplink-downlink reference configuration after sub-frame m+3.

In a second scheme, the base station receives ACK/NACK information, corresponding to downlink sub-frame m, in the first uplink sub-frame in the TDD uplink-downlink reference configuration after sub-frame m+3 and carrying ACK/NACK information for the first type of downlink sub-frames.

In a third scheme, the base station receives ACK/NACK information, corresponding to downlink sub-frame m, in the first uplink sub-frame in the TDD uplink-downlink reference configuration after sub-frame m+3 and not carrying ACK/NACK information for the first type of downlink sub-frames.

On the other hand, the base station performs the following operations after determining the uplink sub-frames to carry ACK/NACK information corresponding to the first type of downlink sub-frames and to carry ACK/NACK information corresponding to the second type of downlink sub-frames and before receiving the corresponding ACK/NACK information.

If the determined uplink sub-frames include uplink sub-frame n and uplink sub-frame n″, with n<n′, corresponding respectively to number of downlink sub-frame $N_{DL}$ and number of downlink sub-frame $N_{DL}'$ in the FDD downlink carrier with $|N_{DL}-N_{DL}'|\geq 2$, and the downlink sub-frames associated with uplink sub-frame n or uplink sub-frame n′ corresponding to max($N_{DL}$, $N_{DL}'$) include the second type of downlink sub-frames, then the base station adjusts evenly the uplink sub-frames corresponding to a part or all of the second type of downlink sub-frames, wherein the time interval between any downlink sub-frame of the first and second type of downlink sub-frames and the corresponding uplink sub-frame is not smaller than a preset processing latency in the system.

And/or

If the determined first type of downlink sub-frames and second type of downlink sub-frames include adjacent downlink sub-frames m′ and m″, with m″>m′, corresponding respectively to uplink sub-frame n′ and uplink sub-frame n″ satisfying n″<n′, then the base station adjusts the uplink sub-frame(s) corresponding to the second type of downlink sub-frame(s) among downlink sub-frame m′ and downlink sub-frame, m″ so that the adjusted uplink sub-frame ñ′ and uplink sub-frame ñ″ corresponding to downlink sub-frame m′ and downlink sub-frame m″ satisfy ñ″≥ñ′, ñ″≥m″+4 and ñ′≥m′+4 to thereby avoid the timing from being reversed.

Furthermore, the base station receiving ACK/NACK information corresponding to the first type of downlink sub-frames according to the PDSCH HARQ feedback timing corresponding to the TDD uplink-downlink reference configuration, and receiving ACK/NACK information, corresponding to downlink sub-frame m in the second type of downlink sub-frames, in the first uplink sub-frame in the TDD uplink-downlink reference configuration after sub-frame m+3 and satisfying the preset condition can alternatively be described as: the base station receiving ACK/NACK information corresponding to the FDD downlink sub-frame n-k, where k∈K, in uplink sub-frame n in the TDD uplink-downlink reference configuration, wherein:

If the TDD uplink-downlink reference configuration is TDD uplink-downlink configuration 0, then K={6,5,4} for n=2 and n=7, and K={4} for n=3, n=8, n=4 and n=9; or K={6,5,4} for n=2 and n=7, K is a null set for n=3 and n=8, and K={5,4} for n=4 and n=9; or K={6} for n=2 and n=7, K={6,5,4} for n=3 and n=8, and K={4} for n=4 and n=9; or K={6,5} for n=2 and n=7, K={5,4} for n=3 and n=8, and K={4} for n=4 and n=9;

Or

If the TDD uplink-downlink reference configuration is TDD uplink-downlink configuration 1, then K={7,6,5,4} for n=2 and n=7, and K={4} for n=3 and n=8; or K={7,6,5} for n=2 and n=7, and K={5,4} for n=3 and n=8;

Or

If the TDD uplink-downlink reference configuration is TDD uplink-downlink configuration 2, then K={8,7,6,5,4} for n=2 and n=7;

Or

If the TDD uplink-downlink reference configuration is TDD uplink-downlink configuration 3, then K={11,10,9,8,7,6} for n=2, K={6,5} for n=3, and K={5,4} for n=4; or K={11,8,7,6} for n=2, K={11,10,6,5} for n=3, and K={5,4} for n=4;

Or

If the TDD uplink-downlink reference configuration is TDD uplink-downlink configuration 4, then K={12,11,10,9,8,7} for n=2, and K={7,6,5,4} for n=3;

Or

If the TDD uplink-downlink reference configuration is the TDD uplink-downlink configuration 5, then K={13,12,11,10,9,8,7,6,5,4} for n=2;

Or

If the TDD uplink-downlink reference configuration is TDD uplink-downlink configuration 6, then K={7,5,4} for n=2 and 7, K={7} for n=3, K={5} for n=4, and K={7,4} for n=8; or K={8,7} for n=2, K={7,6} for n=3, K={6,5} for n=4, K={7} for n=7, and K={7,6,5} for n=8; or K={7} for n=2 and 7, K={7,6,5} for n=3, K={5} for n=4, and K={7,6,5,4} for n=8.

The step 2500 to the step 2520 can be performed particularly the same as the user equipment side, and reference can be made to the relevant description of the user equipment side for details thereof, so a repeated description thereof will be omitted here.

Figure 26:
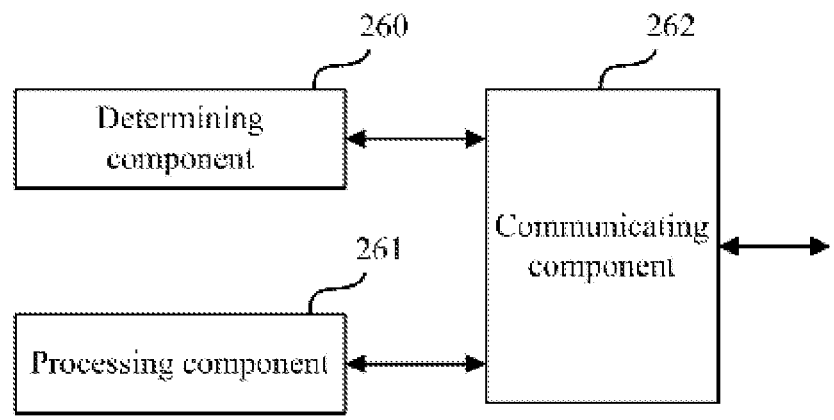
FIG. 26 is a schematic diagram of function structures of a user equipment according to an embodiment of the present invention.
Figure 27:
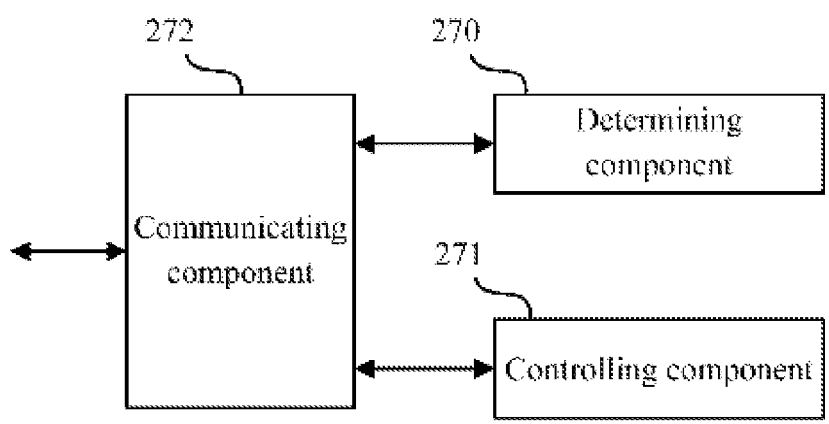
FIG. 27 is a schematic diagram of function structures of a base station according to an embodiment of the present invention.

Based upon the embodiment above, referring to FIG. 26 and FIG. 27, in an embodiment of the present invention, the base station includes a determining component 260, a processing component 261 and a communicating component 262.

The determining component 260 is configured to determine a TDD uplink-downlink reference configuration used to provide HARQ feedback for PDSCH of an FDD downlink carrier.

The processing component 261 is configured to divide all downlink sub-frames of the FDD downlink carrier into two types according to the TDD uplink-downlink reference configuration, wherein a first type of downlink sub-frames correspond to downlink sub-frames or special sub-frames in the TDD uplink-downlink reference configuration, and a second type of downlink sub-frames correspond to uplink sub-frames in the TDD uplink-downlink reference configuration.

The communicating component 262 is configured to receive ACK/NACK information corresponding to the first type of downlink sub-frames according to a PDSCH HARQ feedback timing corresponding to the TDD uplink-downlink reference configuration, and to receive ACK/NACK information, corresponding to downlink sub-frame m in the second type of downlink sub-frames, in the first uplink sub-frame in the TDD uplink-downlink reference configuration after sub-frame m+3 and satisfying a preset condition.

The determining component 270 is configured to determine a TDD uplink-downlink reference configuration used to provide HARQ feedback for PDSCH of an FDD downlink carrier.

The controlling component 271 is configured to divide all downlink sub-frames of the FDD downlink carrier into two types according to the TDD uplink-downlink reference configuration, wherein a first type of downlink sub-frames correspond to downlink sub-frames or special sub-frames in the TDD uplink-downlink reference configuration, and a second type of downlink sub-frames correspond to uplink sub-frames in the TDD uplink-downlink reference configuration.

The communicating component 272 is configured to feed back ACK/NACK information corresponding to the first type of downlink sub-frames according to a PDSCH HARQ feedback timing corresponding to the TDD uplink-downlink reference configuration, and to feed back ACK/NACK information, corresponding to downlink sub-frame m in the second type of downlink sub-frames, in the first uplink sub-frame in the TDD uplink-downlink reference configuration after sub-frame m+3 and satisfying a preset condition.

The foregoing embodiments have been described by only taking an application scenario where a TDD carrier is a primary carrier as an example. In a practical application, the technical solutions according to the embodiments of the present invention will also be applicable to an application scenario where an FDD carrier is a primary carrier, and be applicable to a scenario where there is only an FDD carrier in the system, that is, only a part of uplink sub-frames in the FDD uplink carrier are configured for transmission of ACK/NACK information, so a repeated description thereof will be omitted here.

In summary, in the embodiments of the present invention, a PDSCH HARQ feedback solution has been devised in an application scenario where a TDD carrier is aggregated with an FDD DL carrier, wherein the user equipment divides all downlink sub-frames of the FDD downlink carrier into two types according to the determined TDD uplink-downlink reference configuration used to provide HARQ feedback for PDSCH of the FDD downlink carrier, wherein the first type of downlink sub-frames correspond to downlink sub-frames or special sub-frames in the TDD uplink-downlink reference configuration, and the second type of downlink sub-frames correspond to uplink sub-frames in the TDD uplink-downlink reference configuration; and feeds back ACK/NACK information corresponding to the first type of downlink sub-frames according to the PDSCH HARQ feedback timing corresponding to the TDD uplink-downlink reference configuration and feeds back ACK/NACK information corresponding to downlink sub-frame m in the second type of downlink sub-frames in the first uplink sub-frame in the TDD uplink-downlink reference configuration after sub-frame m+3 and satisfying the preset condition; and correspondingly the base station also receives the ACK/NACK information fed back from the user equipment side in the same way. Thus the user equipment can feed back, in a timely and accurate manner, the ACK/NACK information corresponding to downlink data to the base station, so that the base station can retransmit the data accurately according to the obtained ACK/NACK information to thereby guarantee effectively the performance of the system.

Those skilled in the art shall appreciate that the embodiments of the present invention can be embodied as a method, a system or a computer program product. Therefore the present invention can be embodied in the form of an all-hardware embodiment, an all-software embodiment or an embodiment of software and hardware in combination. Furthermore the present invention can be embodied in the form of a computer program product embodied in one or more computer useable storage mediums (including but not limited to a disk memory, a CD-ROM, an optical memory, etc.) in which computer useable program codes are contained.

The present invention has been described in a flow chart and/or a block diagram of the method, the device (system) and the computer program product according to the embodiments of the present invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the present invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the present invention.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

The invention claimed is:

1. A Hybrid Automatic Repeat ReQuest (HARQ) feedback method, comprising:
   determining a Time Division Duplex (TDD) uplink-downlink reference configuration used to provide HARQ feedback for Physical Downlink Shared Channel (PDSCH) of a Frequency Division Duplex (FDD) downlink carrier;

dividing all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and feeding back Acknowledgement/Negative Acknowledgement (ACK/NACK) information corresponding to the first type of downlink sub-frames according to a PDSCH HARQ feedback timing corresponding to the TDD uplink-downlink reference configuration; and feeding back ACK/NACK information, corresponding to downlink sub-frame m in the second type of downlink sub-frames, in a first uplink sub-frame in the TDD uplink-downlink reference configuration after sub-frame m+3 and satisfying a preset condition, wherein m is an integer.

2. The method according to claim 1, wherein determining the TDD uplink-downlink reference configuration used to provide HARQ feedback for PDSCH of the FDD downlink carrier comprises:

determining a TDD uplink-downlink configuration in use of a TDD carrier aggregated with the FDD downlink carrier as the TDD uplink-downlink reference configuration;

or determining a TDD uplink-downlink configuration configured for HARQ feedback for PDSCH of a TDD carrier aggregated with the FDD downlink carrier as the TDD uplink-downlink reference configuration;

or determining a TDD uplink-downlink configuration configured by higher-layer signaling as the TDD uplink-downlink reference configuration, wherein all uplink sub-frames included in the TDD uplink-downlink configuration configured by higher-layer signaling are a subset of all uplink sub-frames included by a primary carrier;

or determining a TDD uplink-downlink configuration according to a predetermined method as the TDD uplink-downlink reference configuration.

3. The method according to claim 2, wherein determining a TDD uplink-downlink configuration according to the predetermined method as the TDD uplink-downlink reference configuration comprises:

determining TDD uplink-downlink configuration 2 or 5 as the TDD uplink-downlink reference configuration;

or determining TDD uplink-downlink configuration 2 as the TDD uplink-downlink reference configuration when the TDD carrier carrying ACK/NACK information corresponding to the FDD downlink carrier has a switch point of 5 ms, or determining the TDD uplink-downlink configuration 5 as the TDD uplink-downlink reference configuration when the TDD carrier carrying ACK/NACK information corresponding to the FDD downlink carrier has a switch point of 10 ms.

4. The method according to claim 1, wherein feeding back ACK/NACK information, corresponding to downlink sub-frame m in the second type of downlink sub-frames, in the first uplink sub-frame in the TDD uplink-downlink reference configuration after sub-frame m+3 and satisfying the preset condition comprises one or any combination of:

feeding back ACK/NACK information, corresponding to downlink sub-frame m, in the first uplink sub-frame in the TDD uplink-downlink reference configuration after sub-frame m+3;

feeding back ACK/NACK information, corresponding to downlink sub-frame m, in the first uplink sub-frame in the TDD uplink-downlink reference configuration after sub-frame m+3 and carrying ACK/NACK information for the first type of downlink sub-frames; and feeding back ACK/NACK information, corresponding to downlink sub-frame m, in the first uplink sub-frame in the TDD uplink-downlink reference configuration after sub-frame m+3 and not carrying ACK/NACK information for the first type of downlink sub-frames.

5. The method according to claim 1, wherein feeding back ACK/NACK information corresponding to the first type of downlink sub-frames according to the PDSCH HARQ feedback timing corresponding to the TDD uplink-downlink reference configuration, and feeding back ACK/NACK information, corresponding to downlink sub-frame m in the second type of downlink sub-frames, in the first uplink sub-frame in the TDD uplink-downlink reference configuration after sub-frame m+3 and satisfying the preset condition, comprises:

feeding back ACK/NACK information corresponding to the FDD downlink sub-frame n−k, where k∈K in uplink sub-frame n of the TDD uplink-downlink reference configuration, n and k are all integer and K is a set of integers, wherein:

if the TDD uplink-downlink reference configuration is TDD uplink-downlink configuration 0, then K={6,5} for n=2 and 7, K={5,4} for n=3 and 8, and K={4} for n=4 and 9;

or if the TDD uplink-downlink reference configuration is TDD uplink-downlink configuration 2, then K={8,7,6,5, 4} for n=2 and 7;

or if the TDD uplink-downlink reference configuration is TDD uplink-downlink configuration 3, then K={11,10,9,8,7,6} for n=2, K={6,5} for n=3, and K={5,4} for n=4;

or if the TDD uplink-downlink reference configuration is TDD uplink-downlink configuration 4, then K={12,11,10,9,8,7} for n=2, and K={7,6,5,4} for n=3;

or if the TDD uplink-downlink reference configuration is the TDD uplink-downlink configuration 5, then K={13,12,11,10,9,8,7,6,5,4} for n=2;

or if the TDD uplink-downlink reference configuration is TDD uplink-downlink configuration 6, then K={8,7} for n=2, K={7,6} for n=3, K={6,5} for n=4, K={7} for n=7, and K={7,6,5} for n=8.

6. A Hybrid Automatic Repeat ReQuest (HARQ) feedback method, comprising:

determining a Time Division Duplex (TDD) uplink-downlink reference configuration used to provide, at user equipment side, HARQ feedback for Physical Downlink Shared Channel (PDSCH) of a Frequency Division Duplex (FDD) downlink carrier;

dividing all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and receiving Acknowledgement/Negative Acknowledgement (ACK/NACK) information corresponding to the first type of downlink sub-frames according to a PDSCH HARQ feedback timing corresponding to the TDD uplink-downlink reference configuration, and receiving ACK/NACK information, corresponding to downlink sub-frame m in the second type of downlink sub-frames, in a first uplink sub-frame in the TDD uplink-downlink reference configuration after sub-frame m+3 and satisfying a preset condition, wherein m is an integer.

7. The method according to claim 6, wherein determining the TDD uplink-downlink reference configuration used to provide, at the user equipment side, HARQ feedback for PDSCH of the FDD downlink carrier comprises:

determining a TDD uplink-downlink configuration in use of a TDD carrier aggregated with the FDD downlink carrier as the TDD uplink-downlink reference configuration;

or determining a TDD uplink-downlink configuration configured for HARQ feedback for PDSCH of a TDD carrier aggregated with the FDD downlink carrier as the TDD uplink-downlink reference configuration;

or determining a TDD uplink-downlink configuration configured by higher-layer signaling as the TDD uplink-downlink reference configuration, wherein all uplink sub-frames included in the TDD uplink-downlink configuration configured by higher-layer signaling are a subset of all uplink sub-frames included by a primary carrier;

or determining a TDD uplink-downlink configuration according to a predetermined method as the TDD uplink-downlink reference configuration.

8. The method according to claim 7, wherein determining a TDD uplink-downlink configuration according to the predetermined method as the TDD uplink-downlink reference configuration comprises:

determining TDD uplink-downlink configuration 2 or 5 as the TDD uplink-downlink reference configuration;

or determining TDD uplink-downlink configuration 2 as the TDD uplink-downlink reference configuration when the TDD carrier carrying ACK/NACK information corresponding to the FDD downlink carrier has a switch point of 5 ms, or determining the TDD uplink-downlink configuration 5 as the TDD uplink-downlink reference configuration when the TDD carrier carrying ACK/NACK information corresponding to the FDD downlink carrier has a switch point of 10 ms.

9. The method according to claim 6, wherein receiving ACK/NACK information, corresponding to downlink sub-frame m, in the second type of downlink sub-frames in the first uplink sub-frame in the TDD uplink-downlink reference configuration after sub-frame m+3 and satisfying the preset condition comprises one or any combination of:

receiving ACK/NACK information, corresponding to downlink sub-frame m, in the first uplink sub-frame in the TDD uplink-downlink reference configuration after sub-frame m+3;

receiving ACK/NACK information, corresponding to downlink sub-frame m in the first uplink sub-frame in the TDD uplink-downlink reference configuration after sub-frame m+3 and carrying ACK/NACK information for the first type of downlink sub-frames; and receiving ACK/NACK information, corresponding to downlink sub-frame m, in the first uplink sub-frame in the TDD uplink-downlink reference configuration after sub-frame m+3 and not carrying ACK/NACK information for the first type of downlink sub-frames.

10. The method according to claim 6, wherein receiving ACK/NACK information corresponding to the first type of downlink sub-frames according to the PDSCH HARQ feedback timing corresponding to the TDD uplink-downlink reference configuration, and receiving ACK/NACK information, corresponding to downlink sub-frame m in the second type of downlink sub-frames, in the first uplink sub-frame in the TDD uplink-downlink reference configuration after sub-frame m+3 and satisfying the preset condition, comprises:

receiving ACK/NACK information corresponding to the FDD downlink sub-frame n−k, where k∈K, in uplink sub-frame n in the TDD uplink-downlink reference configuration, n and k are all integer and K is a set of integers, wherein:

if the TDD uplink-downlink reference configuration is TDD uplink-downlink configuration 0, then K={6,5} for n=2 and 7, K={5,4} for n=3 and 8, and K={4} for n=4 and 9;

or if the TDD uplink-downlink reference configuration is TDD uplink-downlink configuration 2, then K={8,7,6, 5, 4} for n=2 and 7;

or if the TDD uplink-downlink reference configuration is TDD uplink-downlink configuration 3, then K={11,10, 9,8,7,6} for n=2, K={6,5} for n=3, and K={5,4} for n=4;

or if the TDD uplink-downlink reference configuration is TDD uplink-downlink configuration 4, then K={12,11, 10,9,8,7} for n=2, and K={7,6,5,4} for n=3;

or if the TDD uplink-downlink reference configuration is the TDD uplink-downlink configuration 5, then K={13,12, 11,10,9,8,7,6,5,4} for n=2;

or if the TDD uplink-downlink reference configuration is TDD uplink-downlink configuration 6, then K={8,7} for n=2, K={7,6} for n=3, K={6,5} for n=4, K={7} for n=7, and K={7,6,5} for n=8.

11. A Hybrid Automatic Repeat ReQuest (HARQ) feedback device includes a processor and a memory, wherein the memory is configured to store codes of a computer program and the processor is configured to execute the computer program to:

determine a Time Division Duplex (TDD) uplink-downlink reference configuration used to provide HARQ feedback for Physical Downlink Shared Channel (PDSCH) of a Frequency Division Duplex (FDD) downlink carrier;

divide all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and feed back Acknowledgement/Negative Acknowledgement (ACK/NACK) information corresponding to the first type of downlink sub-frames according to a PDSCH HARQ feedback timing corresponding to the TDD uplink-downlink reference configuration, and to feed back ACK/NACK information, corresponding to downlink sub-frame m in the second type of downlink sub-frames, in a first uplink sub-frame in the TDD uplink-downlink reference configuration after sub-frame m+3 and satisfying a preset condition, wherein m is an integer.

12. The device according to claim 11, wherein the processor configured to determine the TDD uplink-downlink reference configuration used to provide HARQ feedback for PDSCH of the FDD downlink carrier is further configured:

to determine a TDD uplink-downlink configuration in use of a TDD carrier aggregated with the FDD downlink carrier as the TDD uplink-downlink reference configuration;

or to determine a TDD uplink-downlink configuration configured for HARQ feedback for PDSCH of a TDD carrier aggregated with the FDD downlink carrier as the TDD uplink-downlink reference configuration;

or to determine a TDD uplink-downlink configuration configured by higher-layer signaling as the TDD uplink-downlink reference configuration, wherein all uplink sub-frames included in the TDD uplink-downlink configuration configured by higher-layer signaling are a subset of all of uplink sub-frames included by a primary carrier;

or to determine a TDD uplink-downlink configuration according to a predetermined method as the TDD uplink-downlink reference configuration.

13. The device according to claim 12, wherein the processor configured to determine a TDD uplink-downlink configuration according to the predetermined method as the TDD uplink-downlink reference configuration is further configured:

to determine TDD uplink-downlink configuration 2 or 5 as the TDD uplink-downlink reference configuration;

or to determine TDD uplink-downlink configuration 2 as the TDD uplink-downlink reference configuration when the TDD carrier carrying ACK/NACK information corresponding to the FDD downlink carrier has a switch point of 5 ms, or to determine the TDD uplink-downlink configuration 5 as the TDD uplink-downlink reference configuration when the TDD carrier carrying ACK/NACK information corresponding to the FDD downlink carrier has a switch point of 10 ms.

14. The device according to claim 11, wherein the processor configured to feed back ACK/NACK information, corresponding to downlink sub-frame m in the second type of downlink sub-frames, in the first uplink sub-frame satisfying the preset condition after sub-frame m+3 in the TDD uplink-downlink reference, is further configured to perform one or any combination of:

feeding back ACK/NACK information, corresponding to downlink sub-frame m, in the first uplink sub-frame in the TDD uplink-downlink reference configuration after sub-frame m+3;

feeding back ACK/NACK information, corresponding to downlink sub-frame m, in the first uplink sub-frame in the TDD uplink-downlink reference configuration after sub-frame m+3 and carrying ACK/NACK information for the first type of downlink sub-frames; and feeding back ACK/NACK information corresponding to downlink sub-frame m, in the first uplink sub-frame in the TDD uplink-downlink reference configuration after sub-frame m+3 and not carrying ACK/NACK information for the first type of downlink sub-frames.

15. The device according to claim 11, wherein the processor configured to feed back ACK/NACK information corresponding to the first type of downlink sub-frames according to the PDSCH HARQ feedback timing corresponding to the TDD uplink-downlink reference configuration, and to feed back ACK/NACK information, corresponding to downlink sub-frame m in the second type of downlink sub-frames, in the first uplink sub-frame in the TDD uplink-downlink reference configuration after sub-frame m+3 and satisfying the preset condition is further configured to feed back ACK/NACK information corresponding to the FDD downlink sub-frame n−k, where k∈K, in uplink sub-frame n in the TDD uplink-downlink reference configuration, n and k are all integer and K is a set of integers, wherein:

if the TDD uplink-downlink reference configuration is TDD uplink-downlink configuration 0, then K={6,5} for n=2 and 7, K={5,4} for n=3 and 8, and K={4} for n=4 and 9;

or if the TDD uplink-downlink reference configuration is TDD uplink-downlink configuration 2, then K={8,7,6,5, 4} for n=2 and 7;

or if the TDD uplink-downlink reference configuration is TDD uplink-downlink configuration 3, then K={11,10,9,8,7,6} for n=2, K={6,5} for n=3, and K={5,4} for n=4;

or if the TDD uplink-downlink reference configuration is TDD uplink-downlink configuration 4, then K={12,11,10,9,8,7} for n=2, and K={7,6,5,4} for n=3;

or if the TDD uplink-downlink reference configuration is the TDD uplink-downlink configuration 5, then K={13,12,11,10,9,8,7,6,5,4} for n=2;

or if the TDD uplink-downlink reference configuration is TDD uplink-downlink configuration 6, then K={8,7} for n=2, K={7,6} for n=3, K={6,5} for n=4, K={7} for n=7, and K={7,6,5} for n=8.

16. A Hybrid Automatic Repeat ReQuest (HARQ) feedback device includes a processor and a memory, wherein the memory is configured to store codes of a computer program and the processor is configured to execute the computer program to:

determine a Time Division Duplex (TDD) uplink-downlink reference configuration used to provide, at user equipment side, HARQ feedback for Physical Downlink Shared Channel (PDSCH) of a Frequency Division Duplex (FDD) downlink carrier;

divide all downlink sub-frames of the FDD downlink carrier into two types according to the TDD uplink-downlink reference configuration, wherein a first type of downlink sub-frames correspond to the downlink sub-frames or special sub-frames in the TDD uplink-downlink reference configuration, and a second type of downlink sub-frames correspond to uplink sub-frames in the TDD uplink-downlink reference configuration; and receive Acknowledgement/Negative Acknowledgement (ACK/NACK) information corresponding to the first type of downlink sub-frames according to a PDSCH HARQ feedback timing corresponding to the TDD uplink-downlink reference configuration, and to receive ACK/NACK information, corresponding to downlink sub-frame m in the second type of downlink sub-frames, in a first uplink sub-frame in the TDD uplink-downlink reference configuration after sub-frame m+3 and satisfying a preset condition, wherein m is an integer.

17. The device according to claim 16, wherein the processor configured to determine the TDD uplink-downlink reference configuration used to provide, at the user equipment side, HARQ feedback for PDSCH of the FDD downlink carrier is further configured:

to determine a TDD uplink-downlink configuration in use of a TDD carrier aggregated with the FDD downlink carrier as the TDD uplink-downlink reference configuration;

or to determine a TDD uplink-downlink configuration configured for HARQ feedback for PDSCH of a TDD carrier aggregated with the FDD downlink carrier as the TDD uplink-downlink reference configuration;

or to determine a TDD uplink-downlink configuration configured by higher-layer signaling as the TDD uplink-downlink reference configuration, wherein all uplink sub-frames included in the TDD uplink-downlink configuration configured by higher-layer signaling are a subset of all uplink sub-frames included by the primary carrier;

or to determine a TDD uplink-downlink configuration according to a predetermined method as the TDD uplink-downlink reference configuration.

18. The device according to claim 17, wherein the processor configured to determine a TDD uplink-downlink configuration according to the predetermined method as the TDD uplink-downlink reference configuration is further configured:

to determine TDD uplink-downlink configuration 2 or 5 as the TDD uplink-downlink reference configuration;

or to determine TDD uplink-downlink configuration 2 as the TDD uplink-downlink reference configuration when the TDD carrier carrying ACK/NACK information corresponding to the FDD downlink carrier has a switch point of 5 ms, or to determine the TDD uplink-downlink configuration 5 as the TDD uplink-downlink reference configuration when the TDD carrier carrying ACK/NACK information corresponding to the FDD downlink carrier has a switch point of 10 ms.

19. The device according to claim 16, wherein the processor configured to receive ACK/NACK information corresponding to downlink sub-frame m in the second type of downlink sub-frames in the first uplink sub-frame satisfying the preset condition after the sub-frame m+3 in the TDD uplink-downlink reference is further configured to perform one or any combination of:

receiving ACK/NACK information, corresponding to downlink sub-frame m, in the first uplink sub-frame in the TDD uplink-downlink reference configuration after sub-frame m+3;

receiving ACK/NACK information, corresponding to downlink sub-frame m, in the first uplink sub-frame in the TDD uplink-downlink reference configuration after sub-frame m+3 and carrying ACK/NACK information for the first type of downlink sub-frames; and receiving ACK/NACK information, corresponding to downlink sub-frame m, in the first uplink sub-frame in the TDD uplink-downlink reference configuration after sub-frame m+3 and not carrying ACK/NACK information for the first type of downlink sub-frames.

20. The device according to claim 16, wherein the processor configured to receive ACK/NACK information corresponding to the first type of downlink sub-frames according to the PDSCH HARQ feedback timing corresponding to the TDD uplink-downlink reference configuration, and to receive ACK/NACK information, corresponding to downlink sub-frame m in the second type of downlink sub-frames, in the first uplink sub-frame in the TDD uplink-downlink reference configuration after sub-frame m+3 and satisfying the preset condition is further configured to receive ACK/NACK information corresponding to the FDD downlink sub-frame n−k, where k∈K, in uplink sub-frame n in the TDD uplink-downlink reference configuration, n and k are all integer and K is a set of integers, wherein:

if the TDD uplink-downlink reference configuration is TDD uplink-downlink configuration 0, then K={6,5} for n=2 and 7, K={5,4} for n=3 and 8, and K={4} for n=4 and 9;

or if the TDD uplink-downlink reference configuration is TDD uplink-downlink configuration 2, then K={8,7,6,5, 4} for n=2 and 7;

or if the TDD uplink-downlink reference configuration is TDD uplink-downlink configuration 3, then K={11,10, 9,8,7,6} for n=2, K={6,5} for n=3, and K={5,4} for n=4;

or if the TDD uplink-downlink reference configuration is TDD uplink-downlink configuration 4, then K={12,11, 10,9,8,7} for n=2, and K={7,6,5,4} for n=3;

or if the TDD uplink-downlink reference configuration is the TDD uplink-downlink configuration 5, then K={13,12, 11,10,9,8,7,6,5,4} for n=2;

or if the TDD uplink-downlink reference configuration is TDD uplink-downlink configuration 6, then K={8,7} for n=2, K={7,6} for n=3, K={6,5} for n=4, K={7} for n=7, and K={7,6,5} for n=8.

* * * * *